(12) United States Patent
Perkins

(10) Patent No.: US 6,382,530 B1
(45) Date of Patent: May 7, 2002

(54) PRESSURE COMPENSATING DRIP TAPE

(75) Inventor: Lee A. Perkins, Lowden, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 0 days.

(21) Appl. No.: 09/613,282

(22) Filed: Jul. 10, 2000

(51) Int. Cl.[7] .............................................. B05B 15/00
(52) U.S. Cl. .................... 239/542; 239/533.1; 239/562; 239/568
(58) Field of Search .............................. 239/542, 533.1, 239/547, 568, 562, 566

(56) References Cited

U.S. PATENT DOCUMENTS

| | | | | |
|---|---|---|---|---|
| 5,163,622 A | * | 11/1992 | Cohen | 239/542 |
| 5,957,391 A | * | 9/1999 | DeFrank | 239/542 |
| 6,116,523 A | * | 9/2000 | Cabahug et al. | 239/542 |
| 6,120,634 A | * | 9/2000 | Harrold et al. | 156/203 |

* cited by examiner

*Primary Examiner*—Henry C. Yuen
*Assistant Examiner*—Dinh Q. Nguyen
(74) *Attorney, Agent, or Firm*—Nixon & Vanderhye P.C.

(57) ABSTRACT

An irrigation drip tape includes a flexible tube having an interior surface defining a primary flow path. A plurality of secondary flow paths are provided on the interior surface of the tube, the secondary flow paths in substantially axially aligned relationship along a length dimension of the tube. Each of the secondary flow paths are provided with an inlet region, a turbulence-inducing region, a pressure compensation region, and an outlet region having one or more outlets. The outlet region includes a chamber having side walls and upper and lower surfaces with one or more raised surfaces between the upper and lower surfaces to prevent the upper and lower surfaces from engaging and shutting off flow to the one or more outlets as a result of pressure in the primary flow path. The outlet region also includes at least one outlet slit in the tube in communication with the outlet chamber.

23 Claims, 9 Drawing Sheets

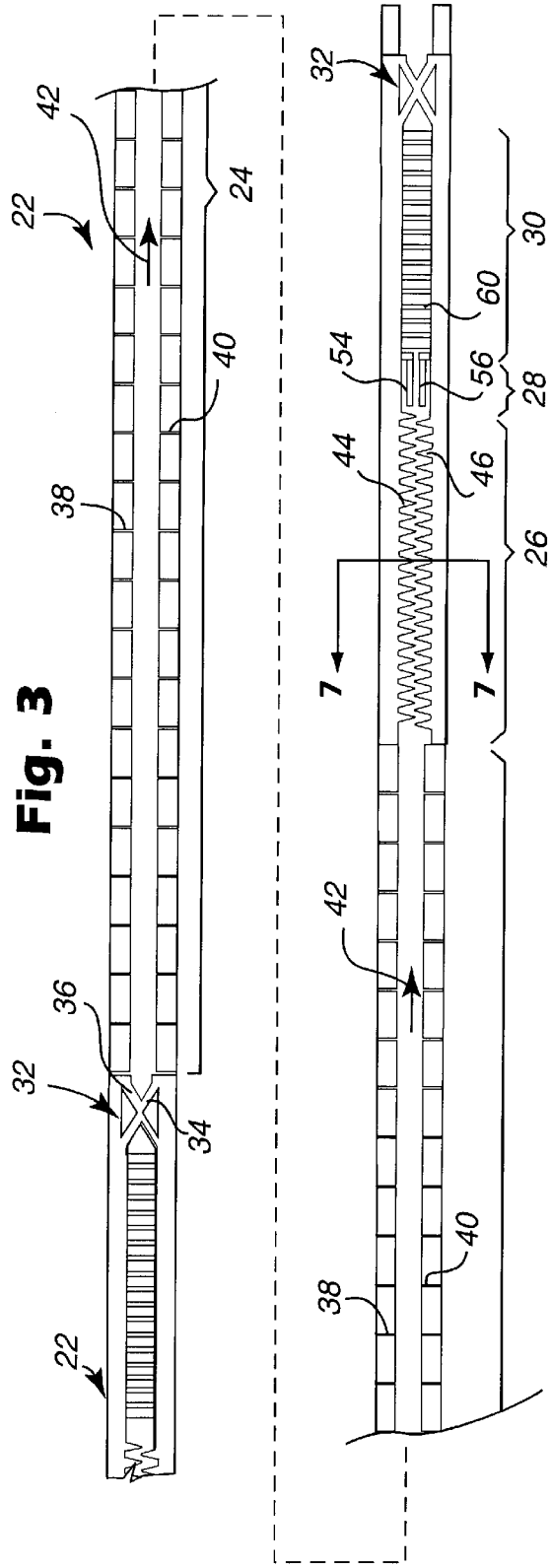
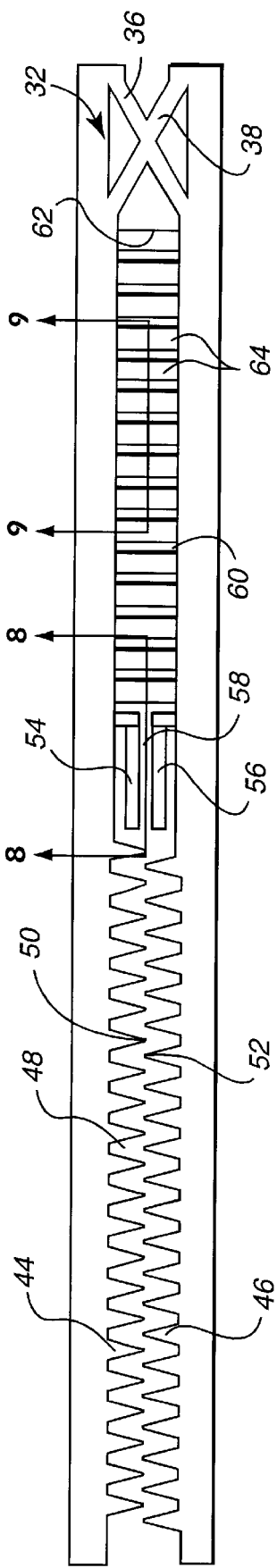
Fig. 3
Fig. 4

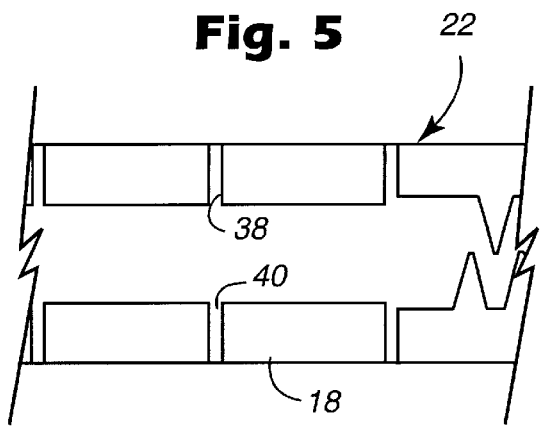
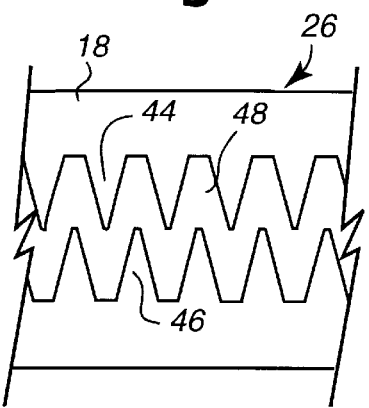
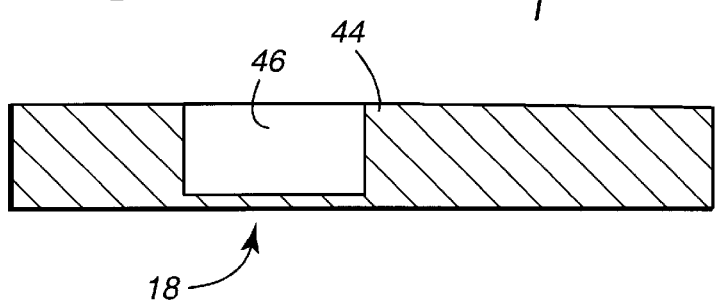
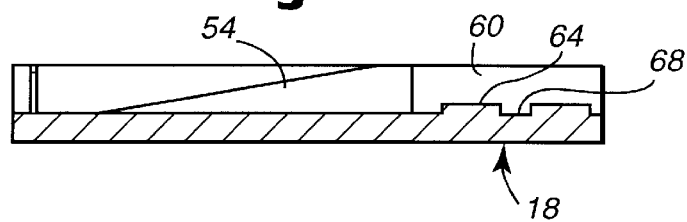
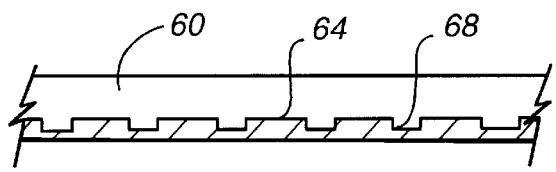

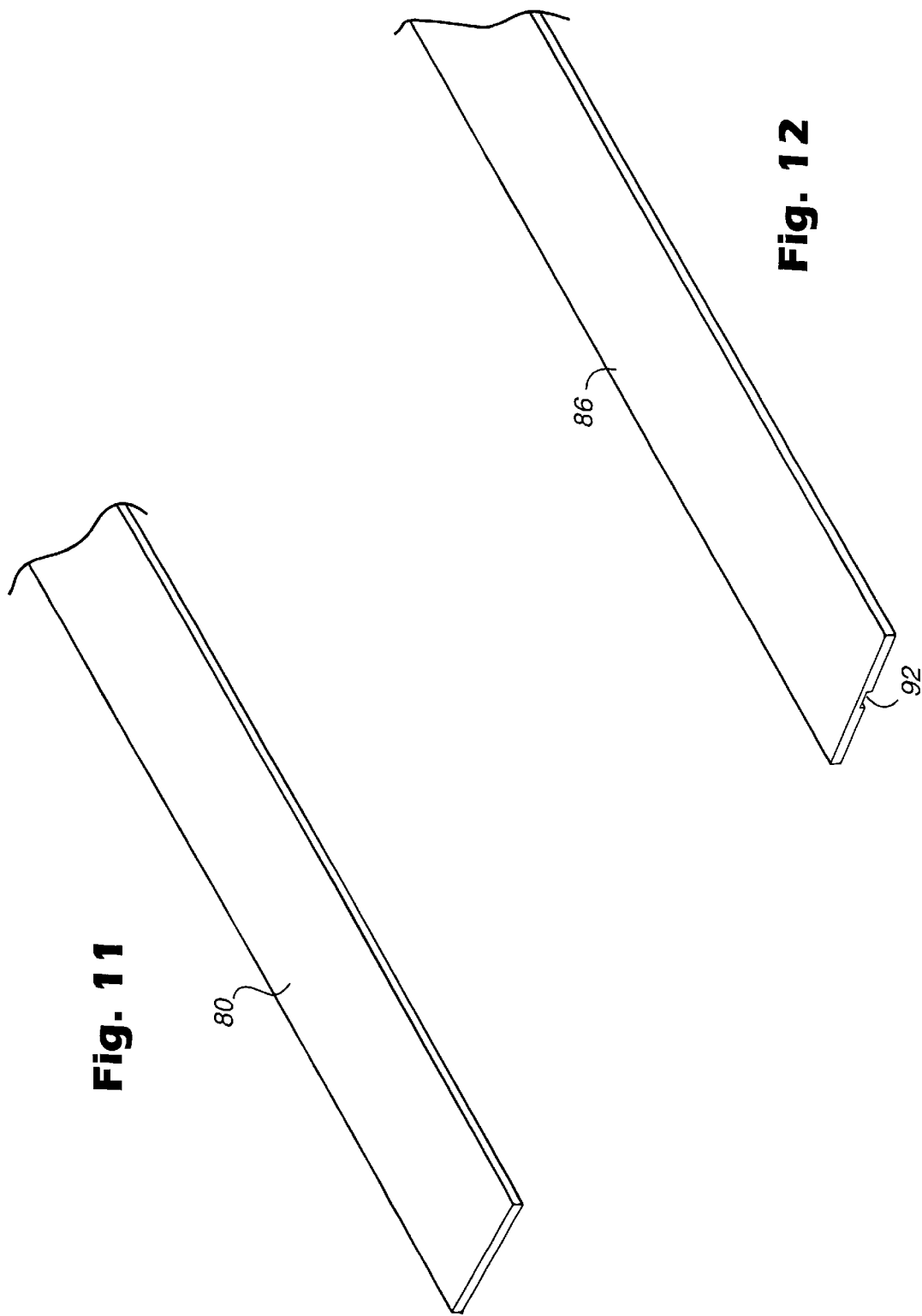

PRESSURE COMPENSATING DRIP TAPE

TECHNICAL FIELD

This invention relates to drip irrigation tape and, specifically, to drip irrigation tape incorporating a pressure compensation feature.

BACKGROUND

Drip irrigation hose or tape has been available now for several years, and is used above and/or below ground. Typically, agricultural drip tapes are formed from relatively thin, flexible, continuous plastic strips folded over and seamed along a longitudinal edge to establish a primary flow path. One or more secondary flow paths are typically located adjacent the primary flow path by fixing discrete emitter devices along the length of the tape or hose, or by applying parallel strips of plastic material within the hose interior (for example, in the area of the longitudinal edge overlap) to form a secondary flow path. The tape is formed with inlets allowing water to move from the primary flow path to the secondary flow path, and outlets allowing water to flow from the secondary flow paths to atmosphere. In other words, water under pressure flows from the primary path to the secondary flow path, and then out of the drip tape in a controlled fashion. The secondary flow path reduces the pressure of the water so that it exits the tape outlets at essentially zero pressure. Some tape or hose constructions also incorporate turbulence inducing regions in the secondary flow path to prevent clogging and to reduce the sensitivity of the flow rate to pressure changes.

Drip irrigation hoses or tapes are well represented in the patent literature, and examples may be found in U.S. Pat. Nos. 3,870,236; 3,896,999; 4,009,832; 4,247,051; 4,430,020; 4,473,191; 4,874,132; 4,880,167; 4,984,739; 5,163,622; 5,181,532; 5,203,503; 5,207,386; 5,282,578; and 5,333,793. The incorporation of pressure compensation has also been attempted with varying degrees of success. Examples may be found in U.S. Pat. Nos. 3,993,248; 4,009,832 and 5,111,995. Relatively rigid discrete emitters have also been employed to provide a pressure compensation feature. See, for example, U.S. Pat. Nos. 4,210,287; 5,330,107; 5,609,303 and 5,813,603.

In commonly owned U.S. Pat. No. 5,688,072, a drip tape construction is disclosed wherein the tape is formed by a strip of flexible PE material folded over and seamed along overlapped longitudinal edges. Interiorly of the tape, and in an area remote from the overlapped seam, there is a longitudinally extending plastic bead or strip which incorporates a series of axially spaced secondary flow paths. Each secondary flow path has inlet, turbulence inducing, and outlet regions, all of which are preformed on one side of a hot melt bead or strip. The pattern or flow path side of the bead is applied face down on the strip so that the strip wall itself closes the secondary flow path except for a plurality of inlets formed in the bead at longitudinally spaced locations along the inlet region. These inlets are arranged perpendicular to the longitudinal axis of the tape, and thus also perpendicular to the secondary flow path. The inlets are located on both sides of the secondary flow path, in longitudinally spaced relationship.

The inlet region of each secondary flow path leads to a turbulence inducing region formed by a series of inwardly directed, projections on opposite sides of the secondary flow channel, in longitudinally offset relationship. This arrangement creates a tortuous path which induces turbulence in the water flowing along the secondary flow path, before exiting the tape.

Downstream of the turbulence inducing region, an outlet region is provided in the secondary flow path that communicates with an elongated slit in the tape wall which allows the water in the secondary flow path to escape in a controlled drip-like fashion. The outlet region, or reservoir, is otherwise axially closed in the downstream direction, thus isolating the path from the inlet region of the next adjacent downstream secondary flow path, and thus also forcing all water to exit via the elongated slit in the tape wall. This drip tape configuration does not, however, include any pressure compensation feature.

SUMMARY OF THE INVENTION

In accordance with one exemplary embodiment of this invention, a unique pressure compensation type drip tape includes a flexible tape or tubular member defining a primary flow path and a longitudinally extending pre-formed bead or strip incorporating multiple, axially oriented secondary flow paths. Each secondary flow path is formed in the strip or bead on three sides with the remaining open face sealed against the tape wall that forms the fourth side of the secondary flow path. Alternatively, the secondary flow path can face the interior of the tape and be sealed by a second strip with a flexible membrane located therebetween.

In either case, the secondary flow path is formed with inlet, turbulence inducing, pressure compensation and outlet regions. The inlet region may be substantially as shown in the commonly owned '072 patent. The turbulence inducing region may include opposed, but axially offset triangularly shaped teeth that create a tortuous path for the water. This region may be formed as disclosed in expired U.S. Pat. No. 4,215,822. The pressure compensation region is located axially between the turbulence inducing region and the outlet region. It includes a pair of laterally spaced, ramped surfaces, preformed in the bead or strip, extending in a longitudinal direction. In the embodiment where the open faced bead is closed by the tape wall, the ramped surfaces taper from the secondary flow path toward the tape wall in the direction of flow. In the alternative embodiment, where the secondary flow path is closed by a second strip, the ramped surfaces taper toward the second strip in the flow direction. As pressure in the primary flow path rises, the ramped area will be forced to move toward the tape wall (the radially inner strip moves toward the ramped area in the alternative embodiment), thus restricting flow. The outlet region in both embodiments includes a longitudinal chamber with a plurality of axially spaced transverse ribs or other protrusions preventing unwanted shut-off of flow to the outlet. In a preferred embodiment, the chamber has a single slit outlet in the outlet chamber, but there may be circumstances where a pair of axially aligned outlet slits are useful as well.

In its broader aspects, therefore, the invention relates to irrigation drip tape comprising a flexible tubular member having an interior surface defining a primary flow path; a plurality of secondary flow paths provided on the interior surface, the secondary flow paths in substantially axially aligned relationship along a length dimension of the tubular member; each of the secondary flow paths comprising an inlet section, a turbulence-inducing-section, a pressure compensation section, and an outlet section, wherein the outlet section includes a chamber having side walls and upper and lower surfaces with one or more raised surfaces between the upper and lower surfaces to prevent the upper and lower surfaces from engaging; and at least one outlet in the tubular member in communication with the outlet chamber.

In another aspect, the invention relates to irrigation drip tape comprising a flexible tubular member having an interior surface defining a primary flow path; a plurality of secondary flow paths secured along the interior surface, the secondary flow paths in substantially axially aligned relationship along a length dimension of the tube; each of the secondary flow paths having an inlet region, a turbulence-inducing region, a pressure compensation region, and an outlet region including an outlet cut in the tubular member, wherein the outlet region includes a chamber having side walls and upper and lower surfaces, and means for preventing the upper and lower surfaces for engaging and shutting off flow to the outlet as a result of pressure in the primary flow path.

In still another aspect, the invention relates to irrigation drip tape comprising a flexible tubular member having an interior surface defining a primary flow path; a plurality of secondary flow paths provided on the interior surface, the secondary flow paths each having an inlet region including a plurality of inlet openings communicating with the primary flow path; a turbulence inducing region having a plurality of substantially triangular shaped teeth projecting alternatively from opposite sides of the secondary flow path, with points of the teeth lying substantially on a longitudinal centerline of the secondary flow path; a pressure compensation region; and an outlet region, the pressure compensation region including a pair of laterally spaced ramps between the turbulence inducing region and the outlet region; and wherein the outlet region includes a chamber having side walls and upper and lower surfaces with a plurality of axially spaced transverse ribs extending between the side walls; and at least one outlet slit in the tubular member in communication with the outlet chamber.

In yet another aspect, the invention relates to irrigation drip tape comprising a flexible tubular member having an interior surface and defining a primary flow path; at least one secondary flow path provided within the tube and isolated from the primary flow path, the secondary flow path having an upper surface, a lower surface and a pair of laterally spaced side walls; the upper surface bonded to the interior surface of the flexible tubular member, and wherein an elongated diaphragm is loosely confined between the lower surface and the secondary flow path; the secondary flow path having an inlet region including one or more inlets in the side walls to thereby permit water in the primary flow path to enter the secondary flow path; a turbulence inducing region downstream of the inlet region; a pressure compensation region downstream of the turbulence inducing region; and an outlet region downstream of the pressure compensation region, the outlet section including one or more outlets permitting water in the secondary flow path to emit to atmosphere, the outlet region including an elongated chamber incorporating means for preventing the diaphragm from engaging the upper surface.

BRIEF DESCRIPTION OF THE DRAWINGS

FIG. 3 is a plan view of a preformed secondary flow strip used in the drip tape construction illustrated in FIGS. 1 and 2;

FIG. 4 is an enlarged partial plan view, illustrating the turbulence inducing, pressure compensation and outlet regions of the preformed secondary flow path shown in FIG. 3;

FIG. 5 is an enlarged detail in plan, of a portion of the inlet region of the drip tape construction shown in FIG. 3;

FIG. 6 is an enlarged partial plan of a portion of the turbulence inducing region of the secondary flow path shown in FIG. 3;

FIG. 7 is a section taken through the line 7—7 of FIG. 3;

FIG. 8 is a section taken through the line 8—8 of FIG. 4;

FIG. 9 is a section taken through the line 9—9 of FIG. 4;

FIG. 11 is a partial perspective of a diaphragm used in the secondary flow path construction illustrated in FIG. 10;

FIG. 12 is a partial perspective of a retaining strip used with the secondary flow path construction shown in FIG. 10;

DETAILED DESCRIPTION OF THE DRAWINGS

Figure 1:
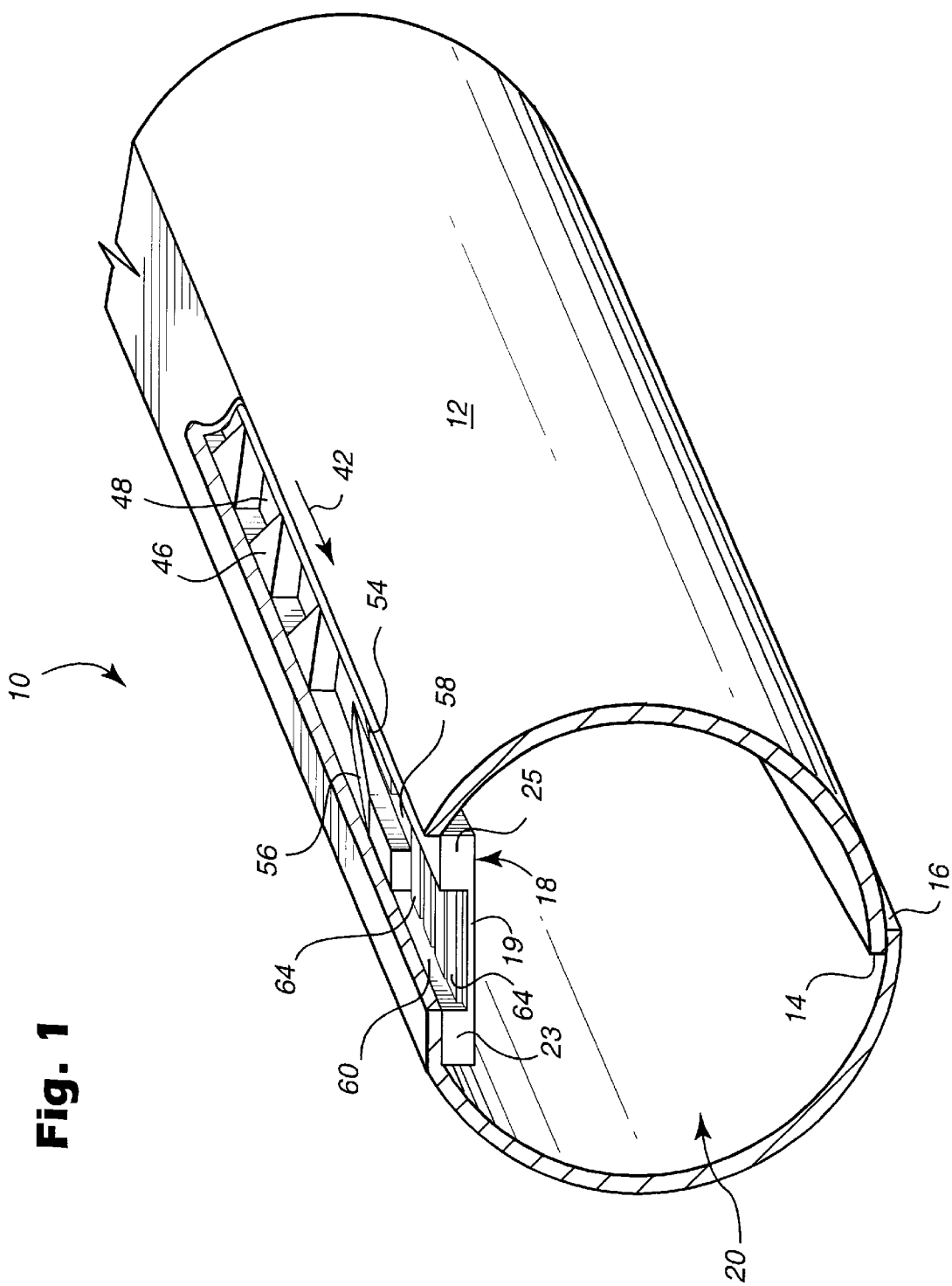
FIG. 1 is a partial perspective of a drip tape construction in accordance with one exemplary embodiment of the invention.
Figure 2:
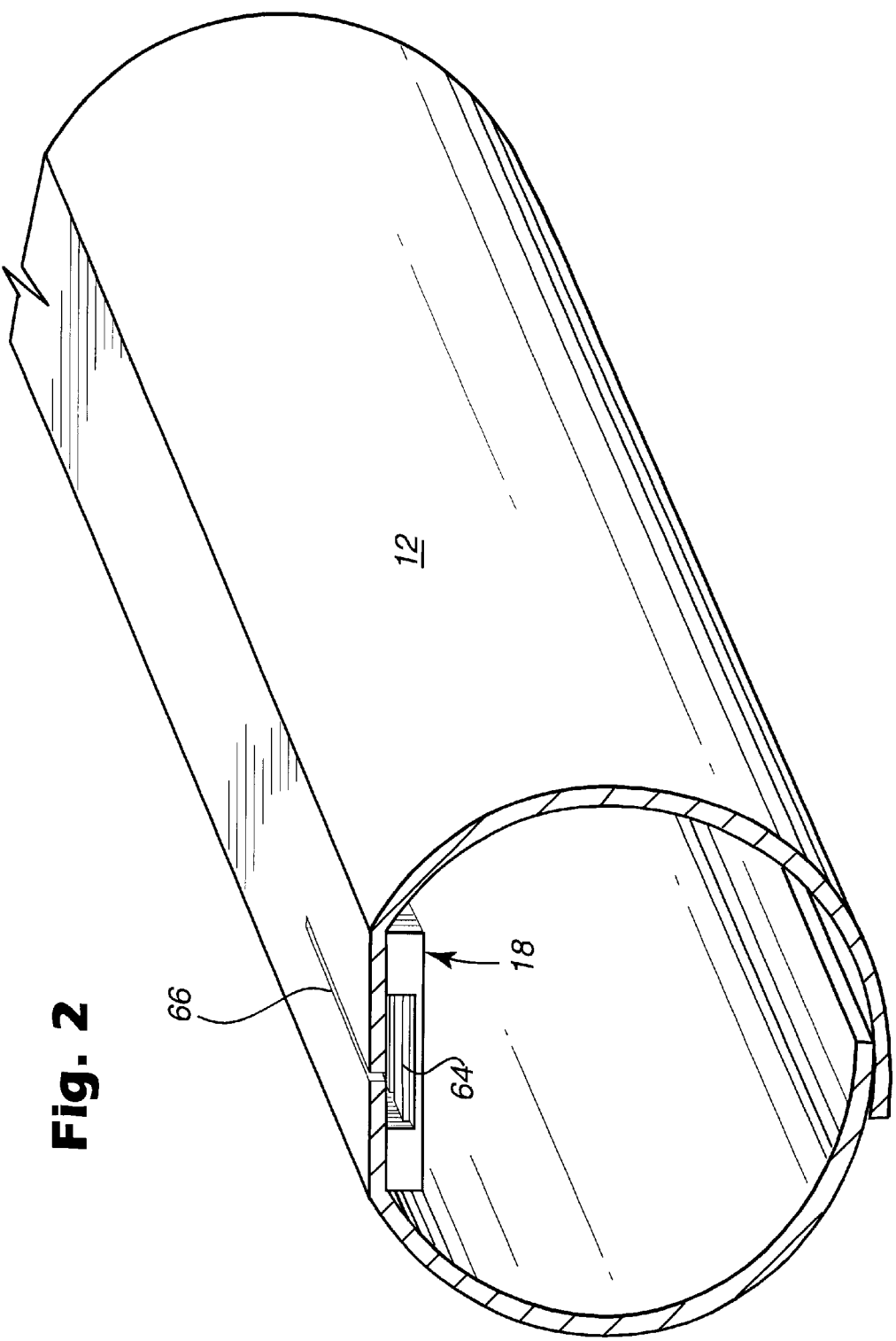
FIG. 2 is a partial perspective of the drip tape construction illustrated in FIG. 1, but taken at a different location along a secondary flow path.

Referring to FIGS. 1–4, the drip tape or tube 10 in accordance with one exemplary embodiment of the invention includes a flexible plastic film or web 12 (sometimes also referred to as the "tape wall") with opposite longitudinal edges 14 and 16 overlapped and bonded to form a tubular member with a single longitudinal seam. The tube or tape 10 could also be formed by extrusion, in which case, no overlapped seam would be present (see FIG. 14).

A longitudinally oriented strip of elastomeric material 18 is located on the inner surface of the tape wall at a location remote from the overlapped seam. Strip 18 could also be made of polyethylene, with appropriate modification as described further herein in connection with the embodiment illustrated in FIGS. 10–14. The tape itself forms a primary flow path 20, while the strip 18 is pre-formed to define a plurality of axially aligned secondary flow paths 22, described further below. The secondary flow paths are identical, and only one such path need be described in detail. Note that in this first embodiment, the secondary flow path 22 is "closed" or sealed at its upper end (as viewed in FIGS. 1 and 2) by the tape wall. The secondary flow path 22 extends along and parallel to the longitudinal axis of the tape. Note also that any references herein to upper or lower, bottom or top, radially "inward" or "outward" or the like, are made viewing the drip tape as oriented in the Figures (particularly FIGS. 1, 2 and 14) and are not otherwise intended as limiting the scope of the invention.

In the exemplary embodiment, the secondary flow path 22 is provided on one side of the strip 18 as best seen in FIG. 1, the flow path 22 defined or formed on three sides including a bottom 19 of the strip, and a pair of side walls 23 and 25 with the "open" fourth side of the flow path "closed" by the tape wall or web 12. The strip 18 incorporates a plurality of pre-formed secondary flow paths 22 in discrete longitudinal segments, e.g., about every 12" along the length of the bead or strip. It will be appreciated, however, that the secondary flow paths may be spaced at other intervals, e.g., 4", 8", 12", 24", 36", etc. as desired.

These secondary flow paths are isolated from each other as described further below. With specific reference to FIGS. 3 and 4, the flow path 22 has four distinct regions—an inlet region 24, a turbulence inducing region 26, a pressure compensation region 28, and an outlet region 30 in axial alignment, running longitudinally (or axially) through the strip 18. The secondary flow path 22 has a depth of about 0.030".

The inlet region 24 begins at an X-shaped end 32, the walls 34, 36 forming the X-shape serving to separate and, in fact, isolate the flow path from the axially adjacent flow path. Of course, path isolation-enabling shapes, other than the illustrated X-shape, could also be employed.

The inlet region 24 includes a plurality of laterally disposed, longitudinally spaced inlets 38 along one side of the strip 18, and a similar number of like inlets 40 on the other side of the strip 18. The inlets 38 and 40 are shown to be aligned with each other, but they may be longitudinally offset if desired. The inlets 38, 40 (preferably small diameter holes, or open-ended slits, also closed by the tape wall, in the opposite side walls of the strip 18) extend perpendicularly to the flow path and hence also to the longitudinal axis of the tape. Other inlet configurations could be employed as well, and the invention here is not to be considered limited to the illustrated arrangement. The inlets enable water flowing in the primary flow path 20 to enter the secondary flow path 22.

Axially downstream of the inlet region 24 is the turbulence inducing region 26 that extends further along the flow path in the flow direction (as indicated by flow arrows 42 in FIGS. 1 and 3). This region has no inlets or outlets other than at the front and back thereof as defined by the flow path 22 itself. This region includes opposed sets of teeth 44, 46 extending toward each other from opposite sides of the secondary flow path. The teeth 44 are axially offset from teeth 46 to create a zig-zag or tortuous flow channel 48 designed to cause turbulent flow. The latter prevents clogging and dissipates flow energy to thereby create a pressure drop in the water. In addition, the turbulence inducing region 26 lowers the pressure of the water entering the pressure compensation region so there is a pressure differential between the fluid in the pressure compensating region and the water in the primary flow path. The turbulence inducing region also prevents extremely high flow (flow spike) from occurring at low pressures. The turbulence inducing region is preferably configured similarly to that disclosed in expired U.S. Pat. No. 4,215,822, noting that the tips 50, 52 of the respective sets of teeth lie substantially on a line through the center of the flow path.

Downstream of the turbulence inducing region 26 is the pressure compensation region 28. This region includes a pair of laterally spaced ramps 54, 56 separated by thin center passage 58. With particular reference to FIGS. 1 and 8, the ramps extend from the flat bottom surface of the flow path upwardly to the top of the path, i.e., toward the tape wall 12, at an angle of about 9.5°. In use, as the water pressure in the primary flow path 20 rises, the residual wall portion of strip 18, directly below the ramps 54, 56, will push the ramps upwardly toward the tape wall to thereby decrease the cross-sectional area of the flow path and increase the length of the path in this region. The degree of pressure compensation and the pressure at which compensation begins is controlled by the hardness of the elastomeric material, the angle of the ramps 54, 56, and the length and width of the region 28. It will be appreciated that the ramping arrangement will respond to any changes in pressure in the primary flow path 20 to increase or decrease flow through the secondary flow path 22, thus providing for uniform discharge from the drip tape regardless of pressure variations in the primary flow path.

Downstream of the pressure compensation region 28 is the outlet region 30. Here, the water enters an elongated chamber 60 that terminates at 62 in another X-shaped rib configuration 32.

Within the outlet chamber 60 (as defined by side walls 23, 25, bottom 19 and web or tape wall 12), a plurality of transverse ribs 64 extend between the side walls 23, 25. These ribs 64 do not extend the full height of the chamber, i.e., they do not extend fully between the bottom 19 and "top," or tape wall 12, as best seen in FIGS. 1 and 9. As explained below, the ribbed outlet region facilitates use of the pressure compensation feature in a flexible tape-type emitter. The ribbed outlet also allows the use of the single (or double) slit outlet 66 (see FIG. 2). Slit outlets (knife edge slits in which no material has been removed, as opposed to die cut openings) greatly improve the reliability of the drip tape in buried applications where pressure compensating products have not been particularly successful. Specifically, slit outlets close completely when the pressure is reduced to zero, preventing root and/or insert intrusion into the secondary flow paths.

Figure 15:
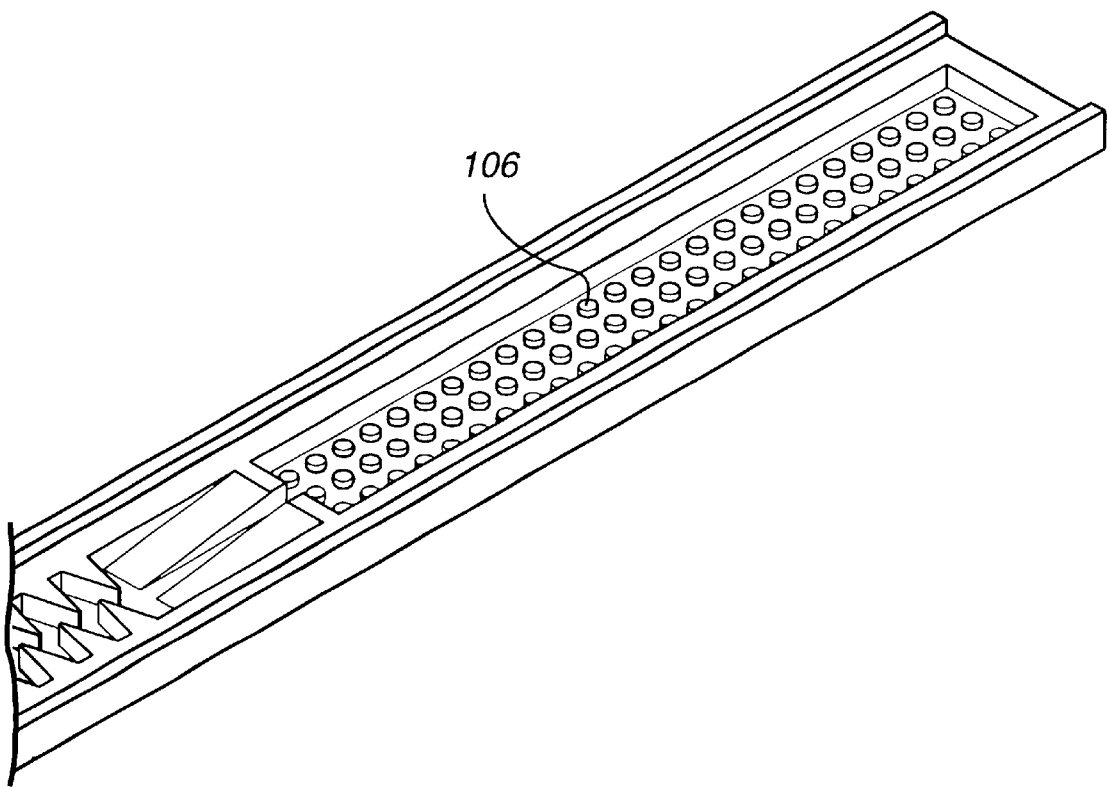
FIG. 15 is a partial perspective view of a drip tape secondary flow path construction in accordance with another exemplary embodiment of the invention.

It will be appreciated that ribs 64 could be replaced by arbitrarily shaped protrusions while achieving the same beneficial results (see FIG. 15).

The raised ribs 64 or other protrusions prevent the bottom outlet region of the secondary flow path 22 from deflecting into the web or tape wall 12 and shutting the outlet slit off, or causing the flow to squirt out of the tape. The "grooves" 68 between the ribs 64 always stay open and provide a passageway for the water to flow through the outlet slit. This is so because even when the strip 18 (in the outlet region) is pushed toward the tape wall under pressure, the resulting curvature of the path wall will leave openings along opposite margins thereof so that water will travel longitudinally along the margins as well as laterally between the ribs, insuring water will reach the outlet slit 66. Without the ribs or other protrusions, the outlet basin must be designed to be rigid, but outlet slits that are otherwise preferable, cannot work properly with a rigid outlet basin.

It will be appreciated that FIGS. 3 and 4 show the pre-formed strip 18 in plan, with the open pattern facing upwardly. It is this face of the strip 18 which is bonded to the interior surface of the tape wall or web 12, so that the secondary flow path 22 is closed along the radially outermost face of the strip 18 by the web 12. Accordingly, water can enter the secondary flow channel 22 of each discrete path only through inlets 38, 40 and can exit only via the slit 66.

In the above described drip tape construction, the strip 12 is formed of a blend of commercially available polyethylenes. It should be understood, however, that all materials (and/or dimensions) recited herein are exemplary only, and may be varied depending on circumstances and objectives. For example, it is well known to engineer material blends (with or without additives) which will meet requirements for specific end use applications.

In a variation of the construction described above, the emitter paths may be formed in a discrete manner, i.e., such that strip 18 is discontinuous, with one emitter path per section.

Figure 13:
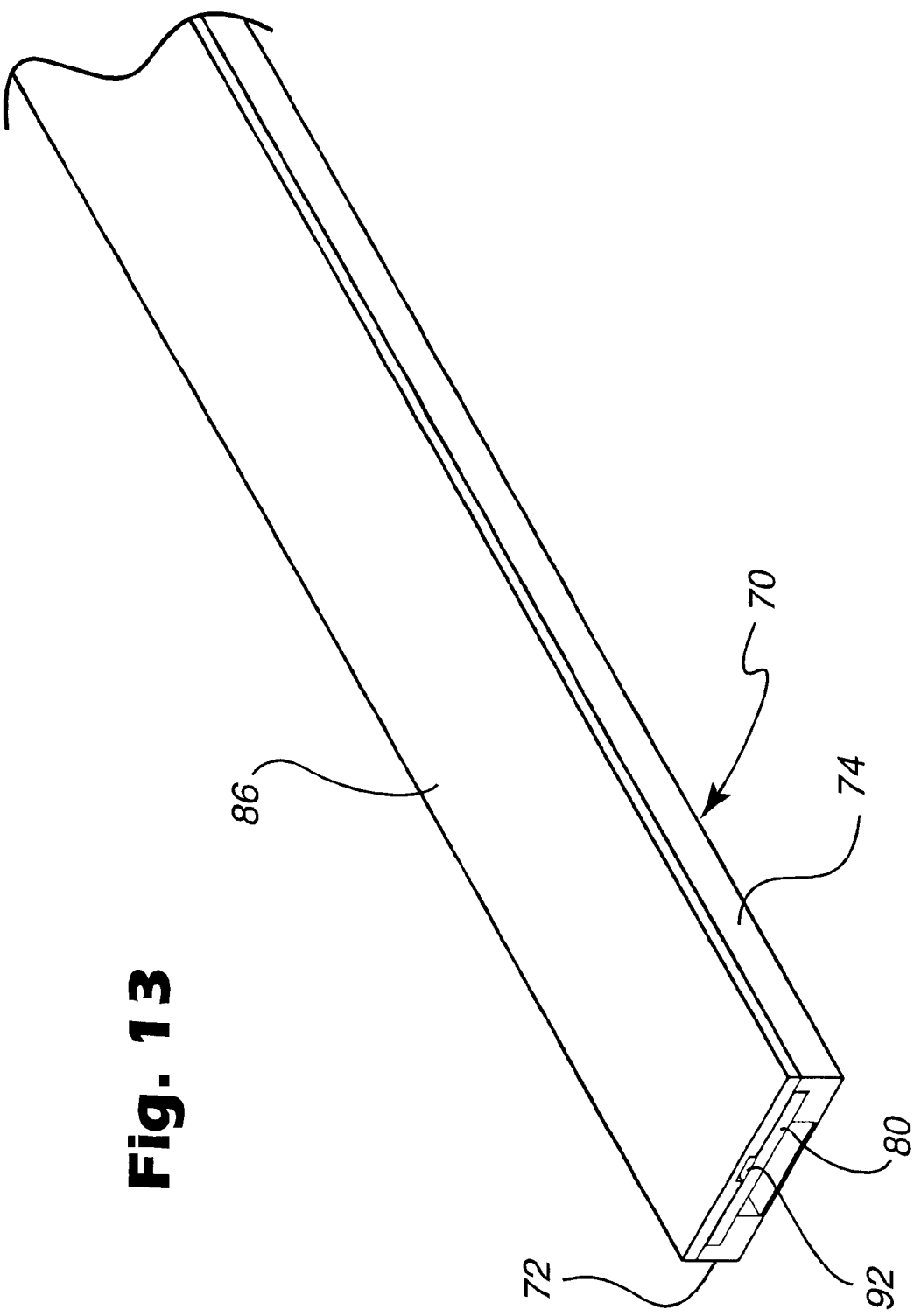
FIG. 13 is a partial perspective view illustrating the secondary flow path in FIG. 10, inverted and with the diaphragm and retaining strips of FIGS. 11 and 12 assembled to the strip.
Figure 14:
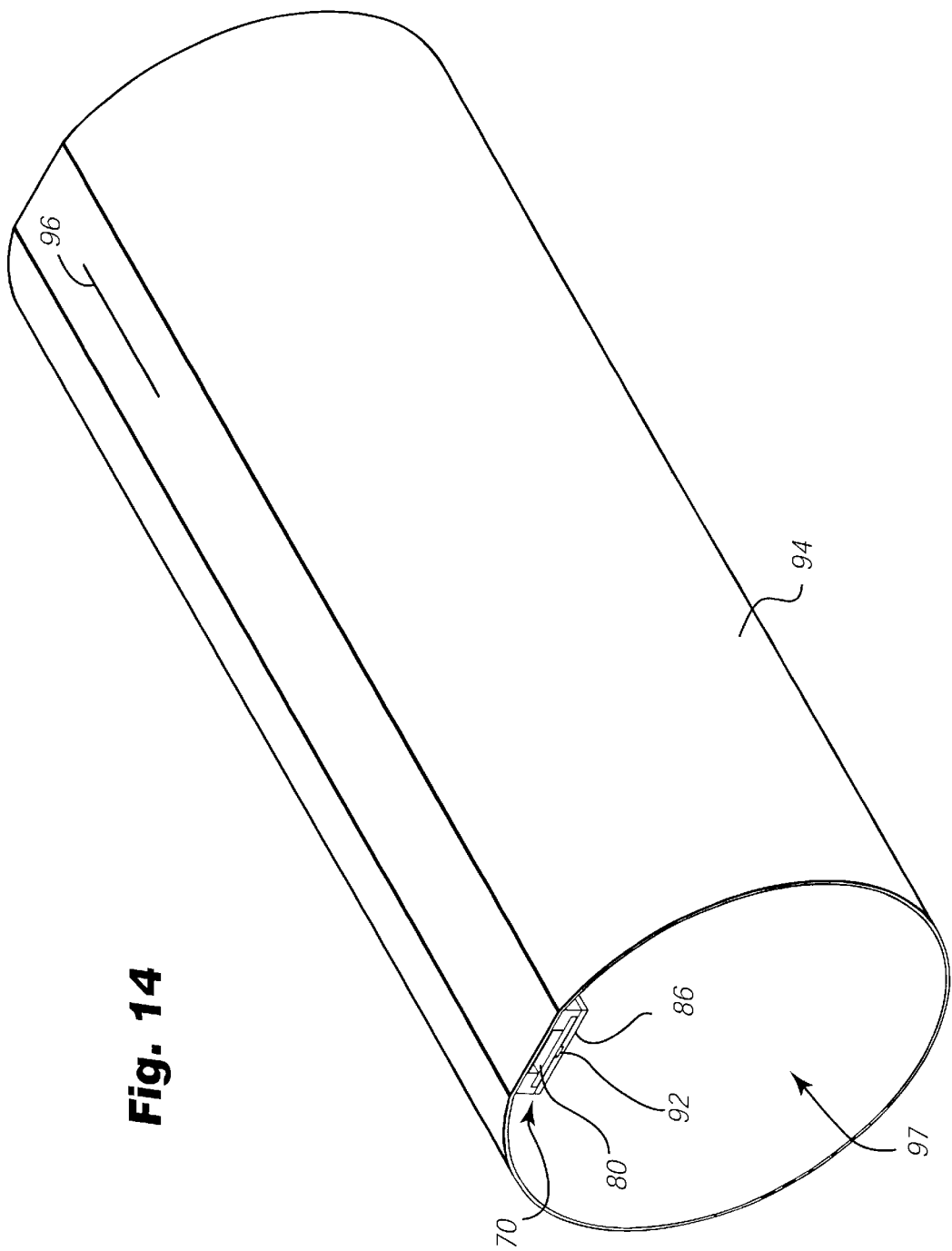
FIG. 14 is a partial perspective view of a drip tape construction incorporating the secondary flow path illustrated in FIG. 10.

As mentioned above, in an alternative embodiment illustrated in FIGS. 10–14, the emitter path or strip 18 may be formed of polyethylene, and be modified so that it can be secured to the web 12 in inverted fashion, i.e., with the open side of the secondary flow path facing inwardly, i.e., towards the center of the tape. With reference to FIGS. 10 through 14, the pre-formed strip 70 has side walls 72, 74 extending from a bottom 76, beyond the secondary flow path top surface 78, so as to permit loose insertion of a flexible diaphragm strip 80 on the surface 78, between shoulders 82, 84 created by extension of the side walls 72, 74. A retainer strip 86 may be sealed along the side wall marginal edges 88, 90 to thereby hold the diaphragm in place, as shown in FIG. 13. Note that strip 86 is formed with an elongated groove 92 along its longitudinal centerline, facing the membrane or diaphragm 80. When bonded to the interior surface of the web 94, the strip 86 will be exposed to the primary flow path 97 (formed by the web 94 when folded and sealed, as best seen in FIG. 14). Diaphragm 80 is preferably an elastomer, while strip 86 is preferably polyethylene.

The secondary flow paths formed in the pre-formed strip 70 may be otherwise identical to the secondary flow paths 22 described above. Accordingly, no detailed description is necessary. It will be appreciated, however, that the outlet slit 96 in the tape wall must also extend through the bottom 76 (and the ribs 102) in the preformed strip 70 in the outlet region. Such a slit is shown at 104 in FIG. 10 for reference only. The slit would be formed simultaneously with the slit in the tape wall, after bonding of the strip 70 to the tape wall. The groove 92 provides a passage for high pressure water from the primary flow path to reach the back side of diaphragm 80 over the compensating region. Thus, rather than having the bottom 19 of the secondary flow path flex toward the tape wall or web 12 as in FIGS. 1–9, here the diaphragm 80 flexes into the secondary flow path towards the ramps 98,100 to thereby restrict flow to the outlet region and slit 104 as in the earlier described embodiment. It will be appreciated that in this embodiment, the transverse ribs (or other projections) in the outlet chamber could be formed on the diaphragm strip 80 rather than on the preformed strip 70. The ribs or other projections would be formed on that side of the diaphragm that faces the outlet slit.

Figure 10:
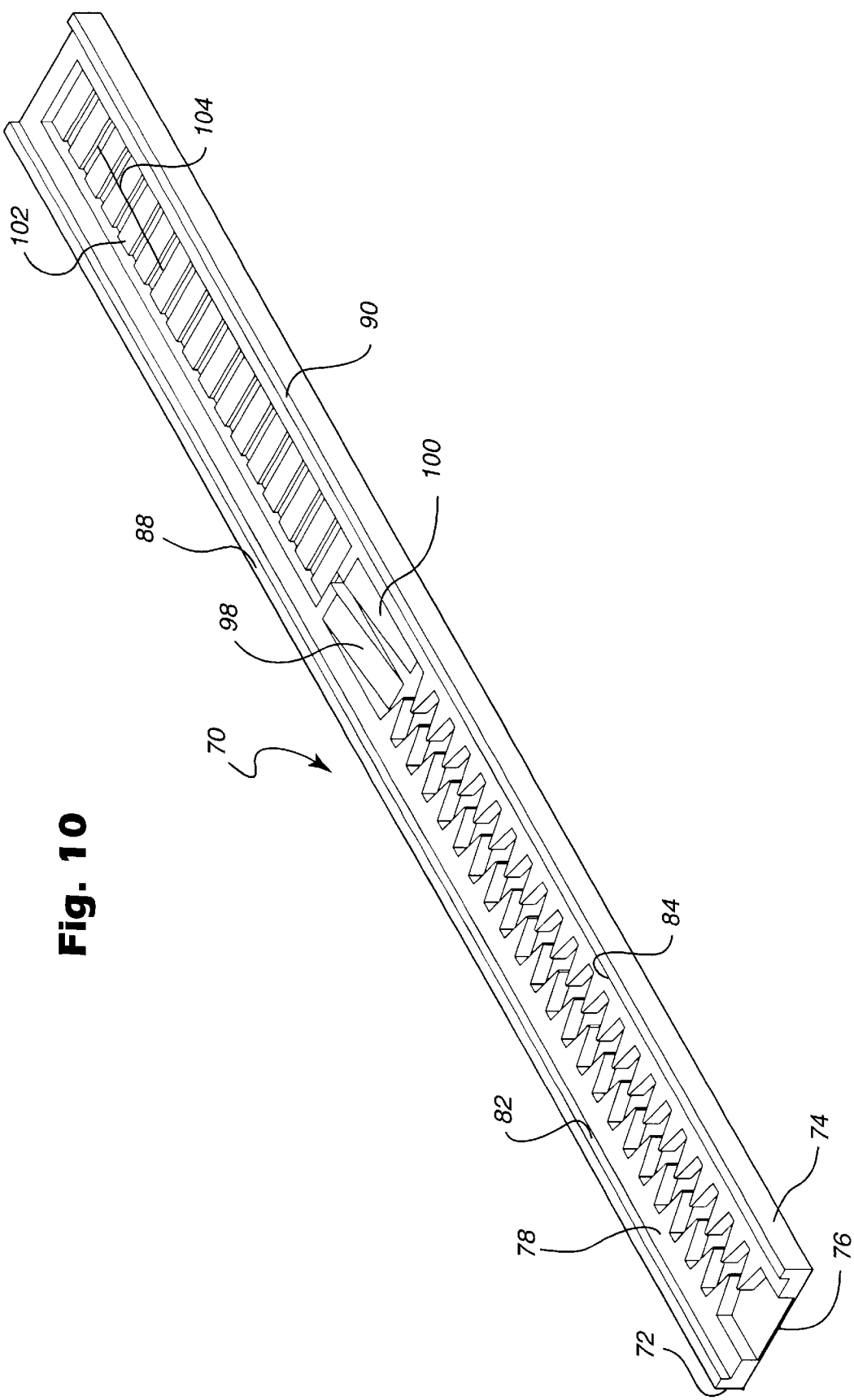
FIG. 10 is a perspective view of a drip tape secondary flow path in accordance with a second exemplary embodiment of the invention.

FIG. 15 illustrates a secondary flow path similar to that shown in FIG. 10, but with the transverse ribs in the outlet region replaced by round projections or dimples 106 that serve the same purpose as the previously described ribs 64 and 102.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Irrigation drip tape comprising:
    a flexible tubular member having an interior surface defining a primary flow path;
    a plurality of secondary flow paths provided on said interior surface, said secondary flow paths in substantially axially aligned relationship along a length dimension of said tubular member; each of said secondary flow paths comprising, in axial sequence, an inlet region, a turbulence-inducing region, a pressure compensation region, and an outlet region, wherein said outlet region includes an outlet chamber having side walls and upper and lower surfaces with one or more raised surfaces between said upper and lower surfaces to prevent said upper and lower surfaces from engaging; and at least one outlet in said tubular member in communication with said outlet chamber.

2. The irrigation drip tape of claim 1 wherein said one or more raised surfaces comprise a plurality of axially spaced transverse ribs extending between said sidewalls.

3. The irrigation drip tape of claim 2 wherein said at least one outlet comprises a single elongated slit.

4. The irrigation drip tape of claim 1 wherein said one or more raised surfaces comprise a plurality of dimples.

5. The irrigation drip tape of claim 1 wherein said at least one outlet comprises a single elongated slit.

6. The irrigation drip tape of claim 5 wherein said elongated slit is formed by a knife edge such that no material is lost in forming said slit.

7. The irrigation drip tape of claim 1 wherein said at least one outlet comprises a pair of elongated slits in axial alignment.

8. The irrigation drip tape of claim 1 wherein each of said secondary flow paths is formed in a continuous, elongated strip of flexible material bonded to said interior surface of said flexible tubular member, and wherein a plurality of said secondary flow paths are incorporated in said strip and isolated from each other.

9. The irrigation drip tape of claim 8 wherein said strip is open along an upper end thereof, said upper end being closed by said interior surface of said flexible tubular member.

10. The irrigation drip tape of claim 1 wherein each of said flow paths is formed in respective, discrete strips of flexible material bonded to said interior surface of said flexible tube.

11. The irrigation drip tape of claim 1 wherein said inlet region comprises a plurality of inlet openings communicating with said primary flow path, and oriented transverse to said longitudinal axis.

12. The irrigation drip tape of claim 1 wherein said turbulence inducing region includes a plurality of substantially triangular shaped teeth projecting alternatively from opposite sides of said secondary flow path, with points of said teeth lying substantially on a longitudinal centerline of said secondary flow path.

13. The irrigation drip tape of claim 1 wherein said pressure compensation region includes a pair of laterally spaced ramps between said turbulence inducing region and said outlet region.

14. The irrigation drip tape of claim 1 wherein said inlet region comprises a plurality of inlet openings communicating with said primary flow path, and oriented transverse to said longitudinal axis; and wherein said turbulence inducing region includes a plurality of substantially triangular shaped teeth projecting alternatively from opposite sides of said secondary flow path, with points of said teeth lying substantially on a longitudinal centerline of said flow path; and further wherein said pressure compensation region includes a pair of laterally spaced ramps between said turbulence inducing region and said outlet region.

15. The irrigation drip tape of claim 1 wherein said tubular member is formed from a web of material with opposite marginal edges of said web overlapped and bonded, and wherein said secondary flow paths are located remote from said overlapped marginal edges.

16. Irrigation drip tape comprising:
    a flexible tubular member having an interior surface defining a primary flow path;
    a plurality of secondary flow paths secured along said interior surface, said secondary flow paths in substantially axially aligned relationship along a length dimension of said tube; each of said secondary flow paths having, in an axial sequence, an inlet region, a turbulence-inducing region, a pressure compensation region, and an outlet region including an outlet cut in said tubular member, wherein said outlet region includes an outlet chamber having side walls and upper and lower surfaces, and means for preventing said upper and lower surfaces from engaging and shutting off flow to said outlet as a result of pressure in said primary flow path.

17. The irrigation drip tape of claim 16 wherein said inlet region comprises a plurality of inlet openings communicating with said primary path, and oriented transverse to said longitudinal axis.

18. The irrigation drip tape of claim 16 wherein said turbulence inducing region includes a plurality of substantially triangular shaped teeth projecting alternatively from opposite sides of said flow path, with points of said teeth lying substantially in a longitudinal centerline of said flow path.

19. The irrigation drip tape of claim 16 wherein said pressure compensation region includes a pair of laterally spaced ramps between said turbulence inducing region and said outlet region.

20. The irrigation drip tape of claim 16 wherein said secondary flow paths are formed in one or more strips of flexible material bonded to said interior surface of said flexible tubular member, said one or more strips of flexible material being open along one side of said secondary flow paths, said one closed by said interior surface of said flexible tubular member.

21. Irrigation drip tape comprising:

a flexible tubular member having an interior surface defining a primary flow path;

a plurality of secondary flow paths provided on said interior surface, said secondary flow paths each having an inlet region including a plurality of inlet openings communicating with said primary flow path; a turbulence inducing region having a plurality of substantially triangular shaped teeth projecting alternatively from opposite sides of said secondary flow path, with points of said teeth lying substantially on a longitudinal centerline of said secondary flow path; a pressure compensation region downstream of said turbulence inducing region; and an outlet region downstream of said pressure compensation region; said pressure compensation region including a pair of laterally spaced ramps between said turbulence inducing region and said outlet region; and wherein said outlet region includes an outlet chamber having side walls and upper and lower surfaces with a plurality of axially spaced transverse ribs extending between said side walls to prevent said upper and lower surfaces from contacting each other; and further wherein at least one outlet slit is provided in said tubular member in communication with said outlet chamber.

22. Irrigation drip tape comprising:

a flexible tubular member having an interior surface and defining a primary flow path;

at least one secondary flow path provided within said tube and isolated from said primary flow path, said secondary flow path having an upper surface, a lower surface and a pair of laterally spaced side walls; said upper surface bonded to said interior surface of said flexible tubular member, and wherein an elongated diaphragm is loosely confined between said lower surface and said secondary flow path; said secondary flow path having an inlet region including one or more inlets in said side walls to thereby permit water in said primary flow path to enter said secondary flow path; a turbulence inducing region downstream of said inlet region; a pressure compensation region downstream of said turbulence inducing region; and an outlet region downstream of said pressure compensation region, said outlet region including one or more outlets permitting water in said secondary flow path to emit to atmosphere, said outlet region including an elongated outlet chamber incorporating means for preventing said diaphragm from engaging said upper surface and shutting off flow to said one or more outlets.

23. The irrigation drip tape of claim 22 wherein said lower surface comprises a separate retaining strip bonded to said side walls.

* * * * *